United States Patent
Trifonov et al.

(10) Patent No.: US 7,502,476 B1
(45) Date of Patent: Mar. 10, 2009

(54) SYSTEMS AND METHODS OF ENHANCING QKD SECURITY USING A HERALDED PHOTON SOURCE

(75) Inventors: Alexei Trifonov, Boston, MA (US); Ekaterina Rogacheva, Boston, MA (US)

(73) Assignee: MagiQ Technologies, Inc., New York, NY (US)

( * ) Notice: Subject to any disclaimer, the term of this patent is extended or adjusted under 35 U.S.C. 154(b) by 454 days.

(21) Appl. No.: 11/139,199

(22) Filed: May 27, 2005

(51) Int. Cl.
 *H04L 9/00* (2006.01)
(52) U.S. Cl. .................. 380/283; 380/256; 380/278; 380/44; 713/171
(58) Field of Classification Search .......... 380/283
 See application file for complete search history.

(56) References Cited

U.S. PATENT DOCUMENTS

| | | | |
|---|---|---|---|
| 5,307,410 A | 4/1994 | Bennett | |
| 5,675,648 A | 10/1997 | Townsend | |
| 7,227,955 B2 * | 6/2007 | Trifonov et al. | 380/256 |
| 2004/0053654 A1 | 3/2004 | Kokumal et al. | |
| 2005/0033705 A1 | 2/2005 | Walmsley et al. | |

OTHER PUBLICATIONS

Hwang, Won-Young, "Quantum Key Distribution with High Loss: Toward Global Secure Communication", May 2003, pp. 1-4.*
Hwang, "Quantum Key Distribution with High Loss: Toward Global Secure Communication", PRL 91(5), pp. 057901-1-4, 2003.
Yuen, "How Unconditionally Secure Quantum Bit Commitment Is Possible", arxiv.org, quant-ph/0109055v2, pp. 1-36, Nov. 20, 2001.
Kim et al, "Multiphoton detection using visible light photon counter", Appl. Phys.Lett. 74(7),pp. 902-904.
Ou, "Parametric down-conversion with coherent pulse pumping and quantum interference between independent fields", Quant.Semiclass.Opt. 9, pp. 599-614, 1997.
Kwiat et al, "Absolute efficiency and time-response measurement of single-photon detectors", Appl.Optics 33(10), pp. 1844-1853, 1994.

(Continued)

*Primary Examiner*—Emmanuel L Moise
*Assistant Examiner*—Shewaye Gelagay
(74) *Attorney, Agent, or Firm*—Opticus IP Law PLLC

(57) ABSTRACT

Systems and method of enhancing the security of a QKD system having operably coupled QKD stations (Alice, Bob) using correlated photon pulses (P1, P2) are disclosed. The method includes generating the correlated photon pulses at Alice and detecting one of the pulses (P2) to determine the number of photons in the other pulse (P1). Pulse P1 is then randomly modulated to form a modulated pulse P1', which is transmitted to Bob. Bob then randomly modulates pulses P1' to form twice-modulated pulses P1". Bob then detects pulses P1" at select timing slots that correspond to the expected arrival times of pulses P1", as well as to the number of photons in pulse P1 (and thus in P1"). Bob then communicates with Alice to determine the number N1 of single-photon pulses P1" detected and the number N2 of multi-photon pulses P1" detected. A security parameter (SP) is defined based on the probabilities of detecting single-photon and multi-photon pulses. Actual numbers of detected single-photon and multi-photon pulses are then compared to the security parameter to assess whether an eavesdropper is or could be interfering with the QKD process.

14 Claims, 9 Drawing Sheets

OTHER PUBLICATIONS

Rarity et al, "Absolute measurement of detector quantum efficiency using parametric downconversion", Appl.Optics 26(21), pp. 4616-4619, 1987.

Rarity et al, "Observation of sub-Poissonian light in parametric downconversion", Opt.Comm. 62(3), pp. 201-206, 1987.

Hong et al, "Experimental Realization of a Localized One-Photon State", PRL 56(1), pp. 58-60, 1986.

Bennett, "Quantum Cryptography: Public Key Distribution and Coin Tossing", International Conference on Computers, Systems and Signal Processing, Bangalore, India, 1984.

Hwang, "Quantum Key Distribution with High Loss: Toward Global Secure Communication," arXiv:quant-ph/0211153 v5 May 19, 2003, pp. 1-4.

* cited by examiner

SYSTEMS AND METHODS OF ENHANCING QKD SECURITY USING A HERALDED PHOTON SOURCE

FIELD OF THE INVENTION

The present invention relates to quantum cryptography, and in particular relates to systems for and method of enhancing the security of a QKD system through the use of correlated photon pulses from a heralded photon source.

BACKGROUND OF THE INVENTION

Quantum key distribution involves establishing a key between a sender ("Alice") and a receiver ("Bob") by using weak (e.g., 1 photon per pulse) optical signals ("quantum signals") transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the quantum signal will introduce errors into the transmitted signals, thereby revealing her presence.

The general principles of quantum cryptography were first set forth by Bennett and Brassard in their article "Quantum Cryptography: Public key distribution and coin tossing," IEEE Proceedings of the International Conference on Computers, Systems and Signal Processing, Bangalore, India, Dec. 10-12, 1984, pp. 175-179. Specific QKD systems are described in the publication by C. H. Bennett et al., entitled "Experimental Quantum Cryptography," J. Cryptology 5: 3-28 (1992), in the publication by C. H. Bennett, entitled "Quantum Cryptography Using Any Two Non-Orthogonal States", Phys. Rev. Lett. 68 3121 (1992), and in U.S. Pat. No. 5,307,410 to Bennett (the '410 patent). The general process for performing QKD is described in the book by Bouwmeester et al., "The Physics of Quantum Information," Springer-Verlag 2001, in Section 2.3, pages 27-33.

Most conventional QKD systems employ a multi-photon source, such as a laser, and attenuate multi-photon pulses to achieve single-photon quantum signals (pulses), i.e., light pulses having a mean photon number $\mu \leq 1$. This is called "weak coherent pulse" or WCP QKD. Other QKD systems employ a single-photon source to generate the quantum signals. One type of single-photon source is called a "heralded photon source," which produces single photons from correlated photon pairs. Photon pairs, created via spontaneous parametric down conversion (SPDC) for example, can be converted to single photons by using one photon as a trigger (signal photon) to collapse the state of the twin (idler) photon from a pair into a single photon state. The use of the trigger photon yields information about the timing of the twin photon, thus effectively eliminating a vacuum component, i.e., those time slots that do not contain any photons.

The trigger-photon method does not provide perfect elimination (blocking) of multi-photon pulses. This is because a single-photon trigger detector typically does not distinguish between single and multiple photon events. Even if the trigger detector is capable of resolving multiple photons, its low quantum efficiency, together with the loss from the trigger optical components, reduces its resolution. Accordingly, if a single-photon source is used in a QKD system, the non-zero probability that multi-photon signals will be generated poses a security risk because an eavesdropper could obtain information about the exchanged key via the multi-photon pulses, e.g., via a photon number splitting (PNS) attack.

Consequently, in prior art QKD systems that use a single-photon source, effort is made to suppress or discard the multi-photon signals generated by the single-photon source. In the case of a heralded single photon source based on parametric down conversion, suppressing multi-photon signals can be accomplished by reducing the rate of photon pair production. While secure, this method reduces the key rate, though not the maximum transmission distance. An attack on the multiple-photon pulses can prove very effective for Eve if she can take advantage of the large channel loss. Thus, the ability to detect Eve changing the efficiency of the delivery of single versus multi-photon pulses from Alice to Bob is the crucial element in maintaining system security in the presence of loss.

One type of security safeguard is the decoy-state method proposed by Hwang in his article entitled "Quantum key distribution with high loss: toward global secure communication," published at arXiv:quant-ph/0211153 v5, May 19, 2003. In the Hwang method, Alice replaces some of the single-photon quantum signals with multi-photon signals as "decoy states." The decoy states allows Alice to determine whether Eve is taking advantage of the channel loss and performing certain type of attack—say, for example, a PNS attack or an unambiguous state discrimination (USD) attack—by checking the loss of the decoy states as compared to that of the quantum pulses. Unfortunately, the Hwang method is only applicable to WCP QKD and does account for the realities of a commercially viable QKD system and that include non-deal components such as single-photon detectors with dark current noise, etc.

SUMMARY OF THE INVENTION

The present invention uses a heralded single-photon source based on spontaneous parametric down conversion (SPDC) for performing QKD. Such a source is not free from multi-photon pulses. As mentioned above, great lengths are taken to block or suppress multi-photon pulses. However, rather than blocking the multi-photon pulses generated by the single-photon source, in the present invention these pulses are "marked" at Alice and sent to Bob in the usual fashion. Alice then knows which pulses sent to Bob were single-photon and which were multi-photon. After a sufficient number of pulses are exchanged, Bob then sends to Alice the information about time slots for which his detector unit successfully records a click. Alice analyzes and compares the probabilities of getting a click from the single-photon and multi-photon pulses. If Eve has implemented an attack (e.g., a PNS or a USD type of attack) that changes the transmittivity of the channel in favor of the multi-photon pulses, then the probability of obtaining a click from a multi-photon pulse must increase, while probability of obtaining a click from the initially single photon pulse must decrease. These probabilities are then used as a security parameter to compare to data relating to the actual number of single-photon and multi-photon pulses received. Comparison of data relating to exchanged photon pulses to the security parameter informs Alice and Bob whether or not someone is attempting to gain information about the exchanged key in a manner that alters the transmittivity of the quantum channel that operably connects Alice to Bob.

Figure 1:
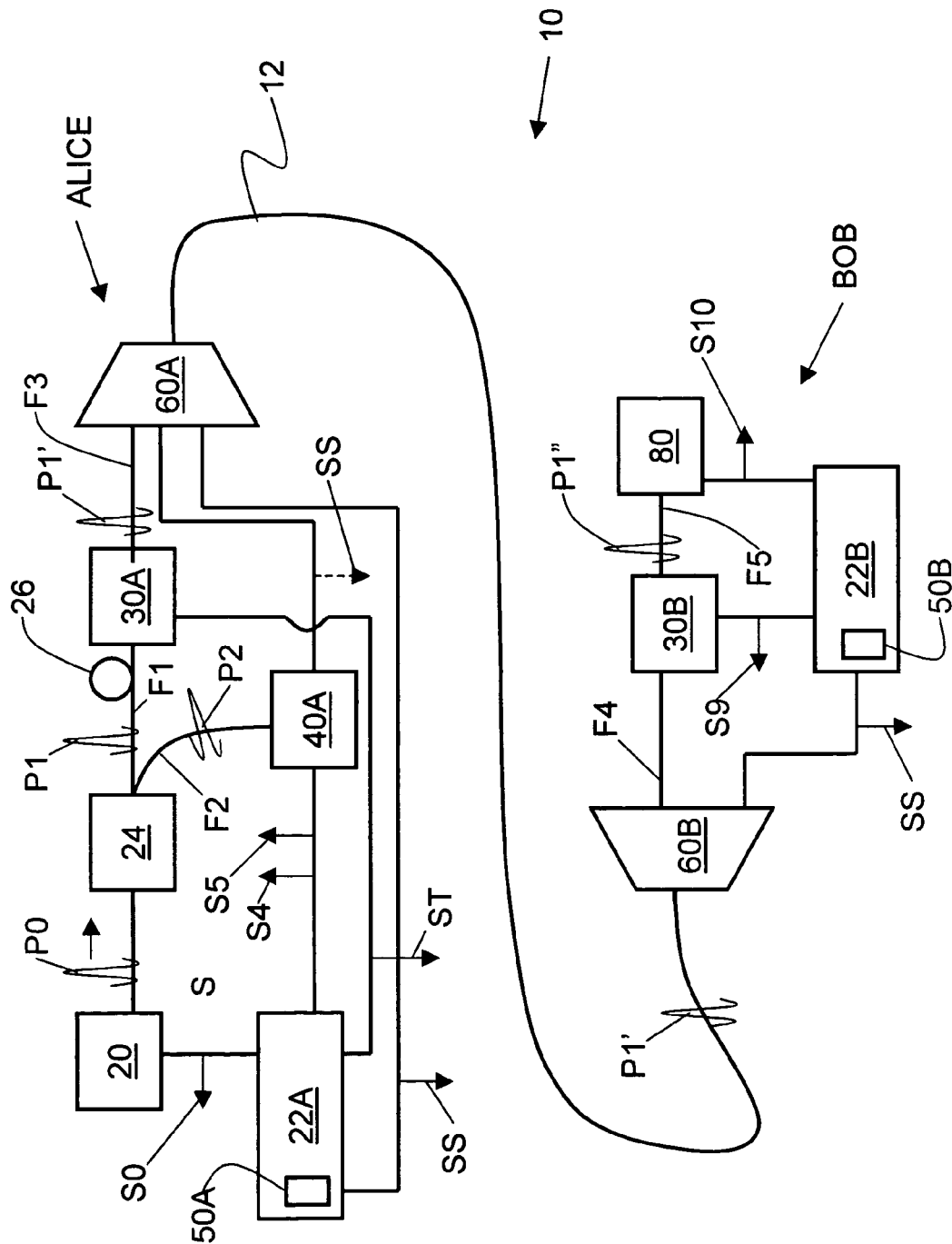
FIG. 1 is a schematic diagram of a QKD system adapted for exchanging both single-photon quantum signals as well as multi-photon pulses using a spontaneous parametric down-conversion (SPDC) single-photon source, wherein the QKD system includes a photon-number-resolving (PNR) detector that allows for identifying the transmission time slots as corresponding to either single-photon or multi-photon pulses.

The various elements depicted in the drawings are merely representational and are not necessarily drawn to scale. Certain sections thereof may be exaggerated, while others may be minimized. The drawings are intended to illustrate various embodiments of the invention that can be understood and appropriately carried out by those of ordinary skill in the art.

DETAILED DESCRIPTION OF THE INVENTION

The present invention provides a QKD security parameter sufficient to detect an attack on multi-photon pulses if a single-photon source that occasionally emits multi-photon pulses is used to implement a QKD protocol (e.g., BB84 or the like) that employs active encoding of quantum signals. An aspect of the present invention improves on the Hwang method for the case of WCP QKD by providing an implementation and protocol adapted for a SPDC single-photon source.

Note that the phrase "single-photon source" is used herein to describe a device capable of generating optical pulses having only one photon, but that also generates on occasion optical pulses that have two or more photons. Accordingly, in the discussion below and in the claims, a pulse generated by the single-photon source is said to have "a number of photons," meaning that it can have one or more photons. The pulses P1 and P2, defined below, are also referred to in some places according to the convention in the art as "photons P1 and P2," even though they can be multi-photon pulses.

Note also that phrases "single-photon pulse" or "multi-photon pulse" refer to pulses leaving Alice. As discussed below, Bob has one or more single-photon detectors (SPDs) that can only register "clicks" that indicate the arrival (or loss) of a pulse that Bob receives (or fails to receive) from Alice over the quantum channel.

As described in greater detail below, rather than blocking the multi-photon pulses generated by the single-photon source, Alice marks them and lets them travel over to Bob as decoy states. The method increases the efficiency of the single-photon source while exploiting the otherwise undesirable multi-photon pulse generation probability as a built-in security function.

In the case of a SPDC heralded single photon source, the invention described herein affects mainly the key generation rate (per time slot), but not the transmission distance.

QKD System with Heralded Photon Source

FIG. 1 is a schematic diagram of a QKD system 10 that includes two QKD stations Alice and Bob optically coupled, e.g., by an optical link 12. Optical fiber link can be, for example, a free-space optical link or an optical fiber link.

Alice

Alice includes a laser 20 operably coupled to a controller 22A. Laser 20 is optically coupled to a non-linear medium (NLM) 24. NLM 24 is, for example, a non-linear crystal such as periodically poled LiNbO3 or KTP in the form of a bulk crystal or in a waveguide. NLM 24 in turn is optically coupled to a state-preparation stage 30A via an optical fiber section F1. NLM 24 is also coupled to a photon-number-resolving (PNR) detector 40A via an optical fiber section F2. Optical fiber section F1 includes a delay line 26 such as fiber spool, to introduce a delay in the optical path of optical fiber section F1 relative to that of optical fiber section F2 for reasons discussed in greater detail below. Laser 20 and NLM 24 constitute a single-photon source capable of generating entangled photon pulses.

In an example embodiment, controller 22A includes a synchronization ("sync") unit 50A adapted to generate sync signals SS for coordinating the synchronization of the QKD system.

Controller 22A is operably coupled to state preparation stage 30A and PNR detector 40A. Controller 22A is operably coupled to an optical multiplexer 60A, which is optically coupled to Bob via an optical link 12. State-preparation stage 30A is optically coupled to optical multiplexer 60A via an optical fiber section F3.

Figure 2A:
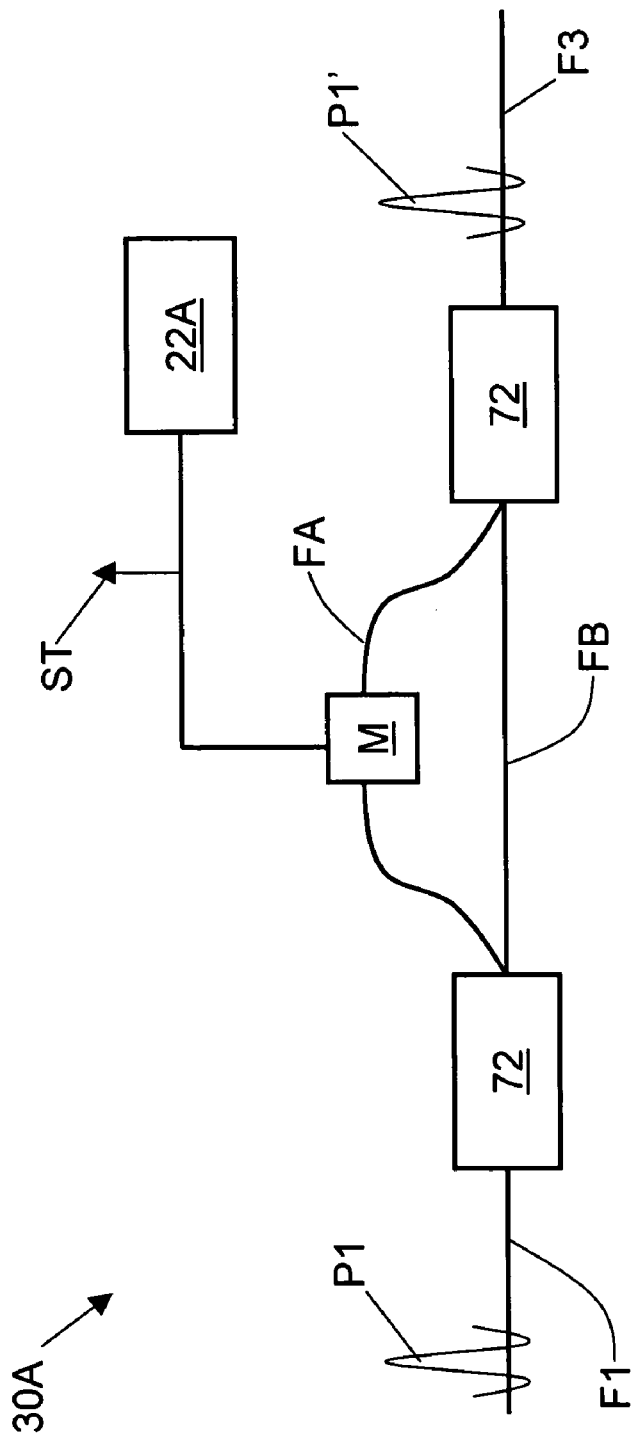
FIG. 2A is a schematic diagram illustrating the state-preparation stage of FIG. 1, wherein the stage uses a fiber-optic Mach-Zehnder interferometer loop with a phase modulator M in one arm to randomly modulate the phase of the outgoing pulse.

FIG. 2A is a schematic diagram illustrating an example embodiment of the state preparation stage 30A of FIG. 1, wherein the stage uses a fiber-optic Mach-Zehnder interferometer loop with a phase modulator M in one arm. The loop is formed from optical fiber sections FA and FB and two optical couplers 72. Phase modulator M is shown arranged in optical fiber section FA and operably coupled to controller 22A. Modulator M is activated by trigger signal ST from controller 22A, as discussed below.

Figure 2B:
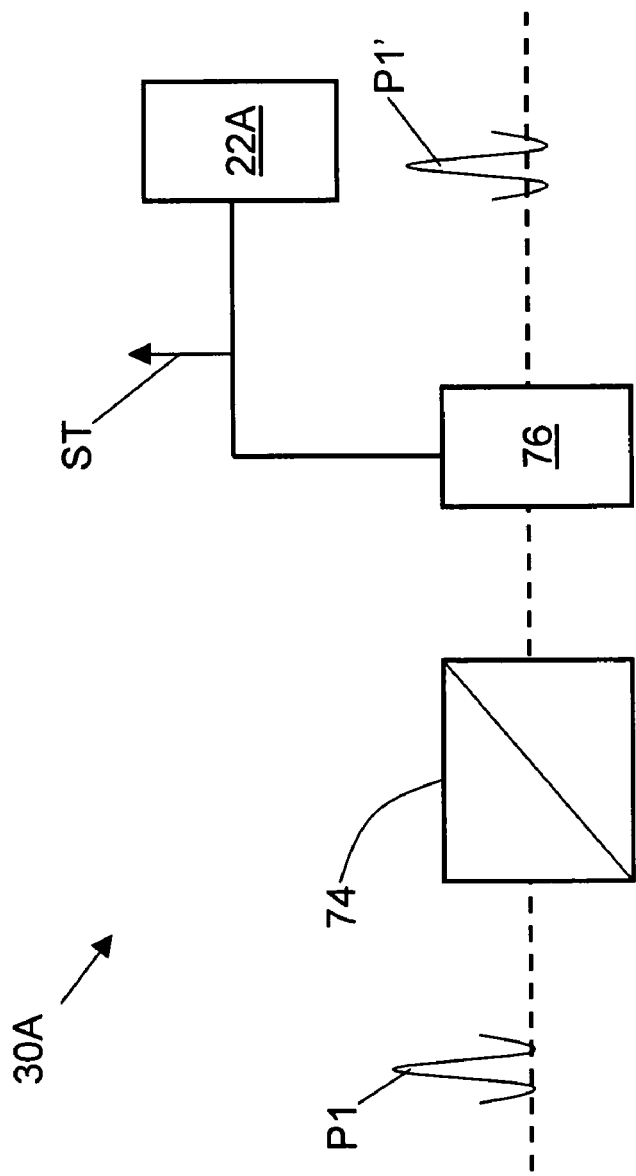
FIG. 2B is a schematic diagram illustrating another example of the state preparation stage of FIG. 1 suitable for a free-space QKD system, wherein the stage uses a polarizing beamsplitter and a Pockels cell to randomly polarization-encode the outgoing pulse.

FIG. 2B is a schematic diagram illustrating another example of the state preparation stage 30A of FIG. 1, suitable for a free-space QKD system embodiment, wherein the stage uses a polarizing beamsplitter (PBS) 74 and a Pockels cell 76 to polarization-encode the pulse P1. Pockels cell 76 is operably coupled to controller 22A and is activated by trigger signal ST.

Figure 3A:
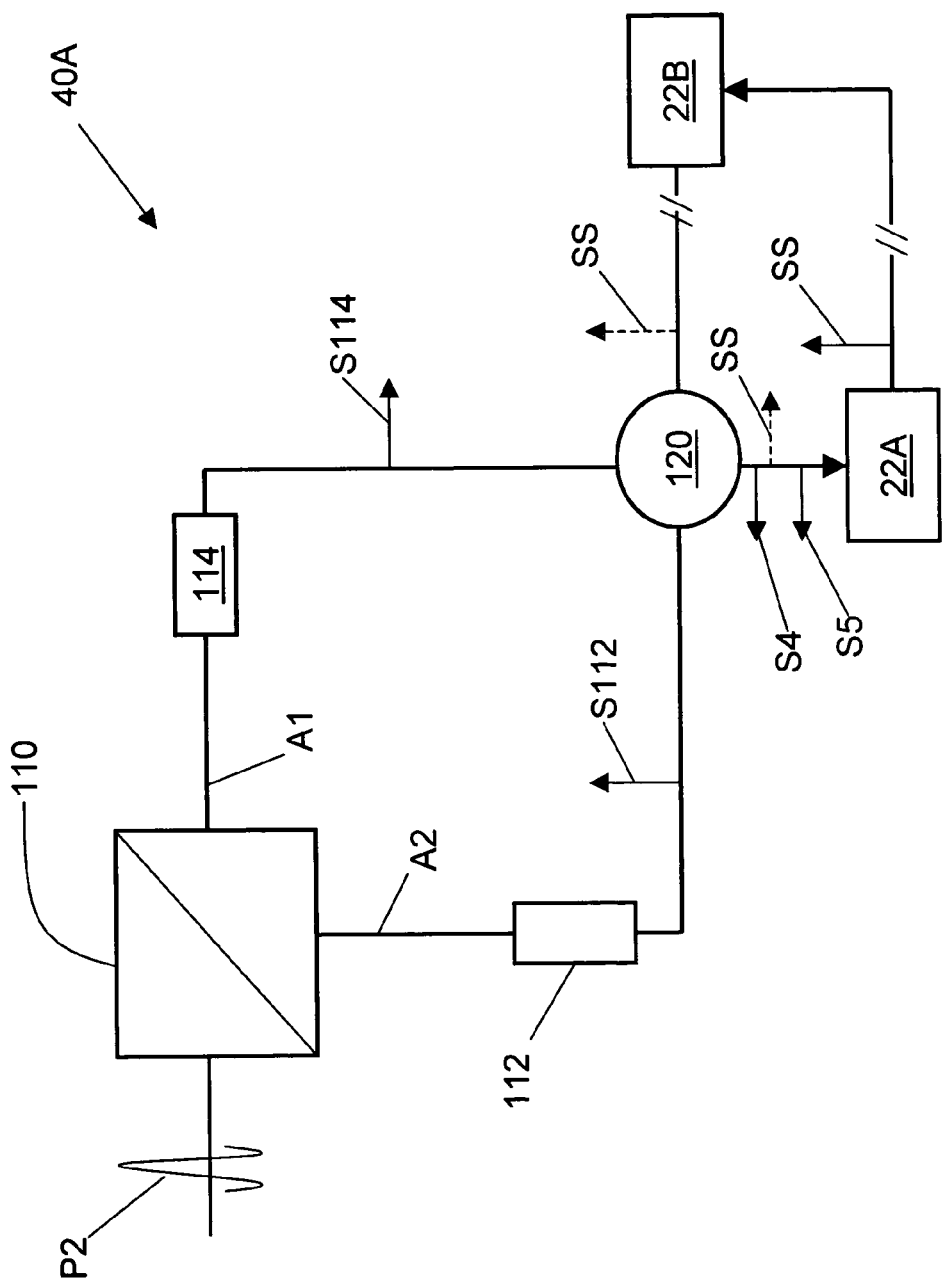
FIG. 3A is a schematic diagram of an example embodiment of the PNR detector of FIG. 1, wherein the PNR detector employs two SPDs and a coincidence rate circuit.

FIG. 3A is a schematic diagram of an example embodiment of PNR detector 40A that employs a 50:50 beamsplitter (coupler) 110 and two single-photon detectors (SPDs) 112 and 114 arranged along respective beamsplitter axes A1 and A2 so as to receive pulses directed along the respective axes by the beamsplitter. The outputs of SPDs 112 and 114 are connected to a coincidence rate circuit 120. SPDs 112 and 114 generate respective output signals S112 and S114 when a detection event occurs in the corresponding detector.

If only one of SPDs 112 and 114 detects a photon (i.e., the SPD "clicks"), then coincidence rate circuit 120 receives only one of signals S112 and S114 and generates in response thereto a photon count signal S4 to controller 22A indicating that pulse P2 had a single photon. If both SPDs 112 and 114 detect a photon, then coincidence rate circuit 120 receives both signals S112 and S114 and in response thereto generates a photon count signal S5 to controller 22A indicating that pulse P2 had multiple photons. In an example embodiment, rather than Alice generating sync signal SS, coincident rate circuit 120 generates a sync signal SS (dashed arrow) that is sent to controller 22A and also to controller 22B at Bob.

Figure 3B:
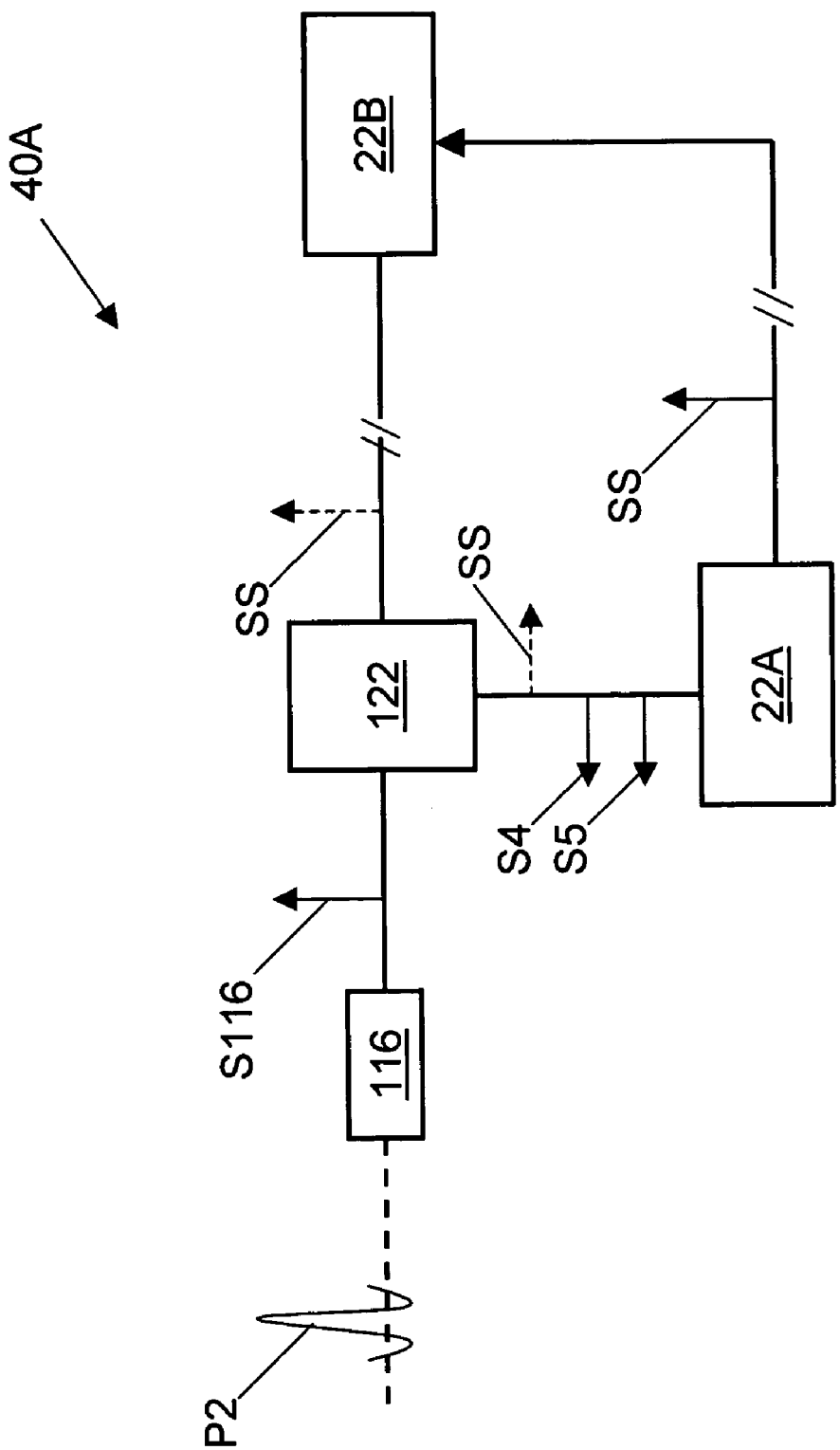
FIG. 3B is a schematic diagram of an example embodiment of the PRN detector of FIG. 1, wherein the PNR detector includes a photodetector electrically coupled to an output source analyzer.

FIG. 3B is an alternative example embodiment of PNR detector 40A that employs a photodetector 116 electrically coupled to an output source analyzer (OSA) 122. Photodetector 116 is adapted to discern between single-photon signals and multi-photon signals and provide a signal S116 to OSA 122 that is representative of the number of photons detected. In response thereto, OSA 122 generates a sync signal SS that is sent to controllers 22A and 22B, and photon count signals S4 and S5 to controller 22A that indicate whether the outputted photon is single-photon or multi-photon. Such PNR detectors are described in the following three references, each of which are incorporated by reference herein:

1) http://emtech.boulder.nist.gov/div817b/pubs/downloads/qcomm/aim-PRLpreprint.pdf 2) http://qubit.nist.gov/giset-PDF/Nam.QISET2004.pdf 3) http://arxiv.org/PS_cache/quant-ph/pdf/0310/0310066.pdf Bob With continuing reference to FIG. 1, Bob includes a demultiplexer 60B coupled to optical link 12. Bob also includes a state-detection stage 30B optically coupled to demultiplexer 60B via optical fiber section F4. A detector unit 80 is optically coupled to state-detection stage 30B via an optical fiber section F5. Bob further includes a controller 22B operably coupled to demultiplexer 60B, state-detection stage 30B, and the detector unit 80. In an example embodiment, controller 22B includes a sync unit 50B coupled to Alice's sync unit, e.g., via demultiplexers 60A and B and optical link 12.

Figure 4:
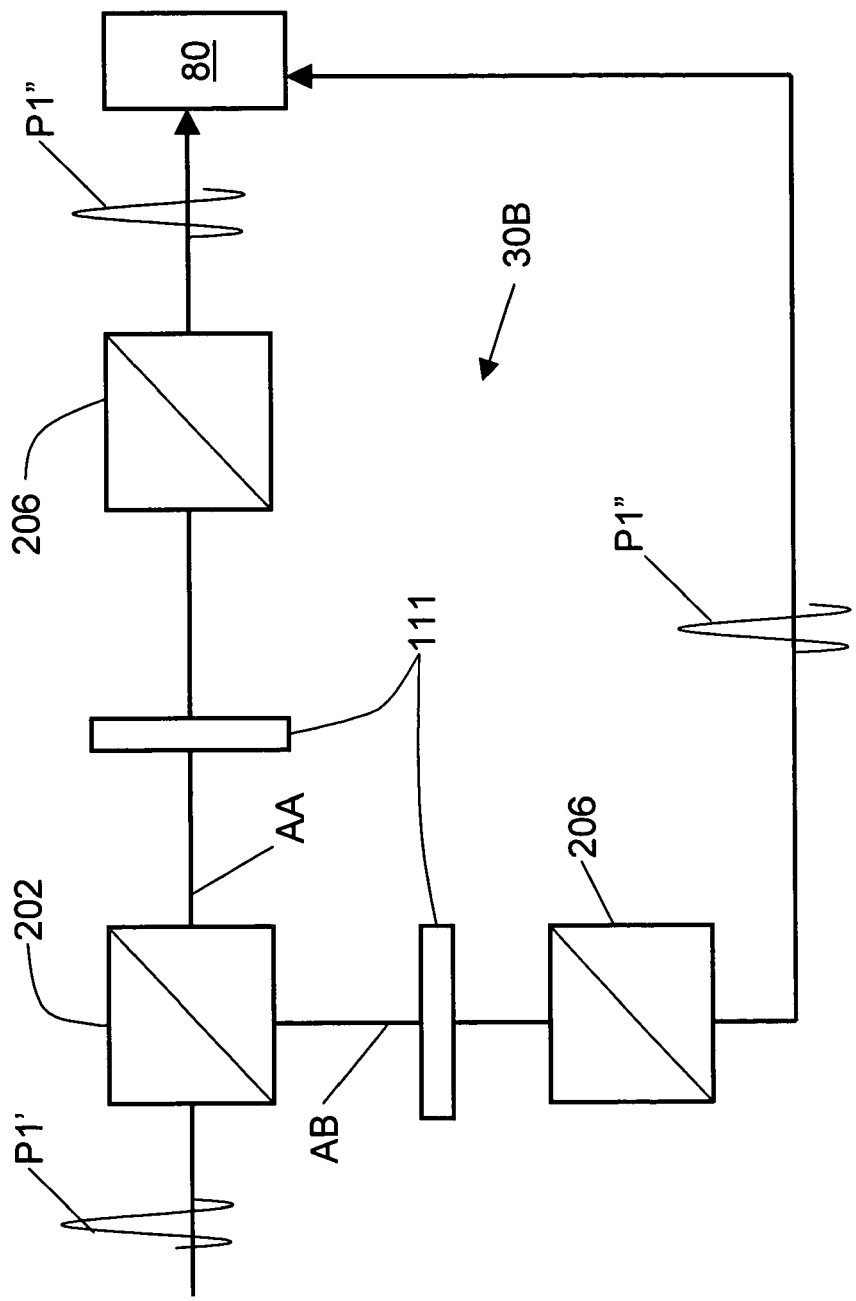
FIG. 4 is a schematic diagram of an example embodiment of state-detection stage for a free-space QKD system that can be used in combination with the state-preparation stage of FIG. 2B.

In an example embodiment, state-detection stage 30B is the same as or is similar to the state-preparation stage 30A illustrated in FIG. 2A. FIG. 4 is a schematic diagram of another example embodiment of state-detection stage 30B for a free-space QKD system and that can be used in combination with state preparation stage 30A of FIG. 2B. State-detection stage 30B of FIG. 4 includes a first beamsplitter 202 that has two associated axes AA and AB. Each axis AA and AB has arranged therein downstream of beamsplitter 202 a polarization controller 111 and a polarizing beamsplitter 206. A state-detection stage 30B according to FIG. 4 need not be controlled by controller 22B because the measurement of the quantum signal state at Bob does not require activation of a modulator (i.e., is inherently random). The output of measurements taken along axes AA and AB are inputted into detector stage 80.

Method of Operation

With continuing reference to FIG. 1, in the operation of system 10, in an example embodiment laser 20 is run in a pulsed mode and generates pulses P0 in response to a control signal S0 from controller 22A. Pulses P0 are received by non-linear crystal NLM, which in response thereto emits a pair (pairs) of correlated photons P1 and P2. Entangled photons are not generated precisely at the time pulse P0 arrives at non-linear crystal NLG, but rather are generated with some timing uncertainty.

One of the entangled photons—say P1—is the idler photon and is sent to state preparation stage 30A over optical fiber section F1. In an example embodiment, photon P1 has a wavelength of about 1550 nm for fiber optics applications, while in another example embodiment has a wavelength of about 800 nm for free space applications. The remaining entangled photon P2—the trigger photon—travels to the PNR detector 40A over optical fiber section F2. PNR detector 40A is adapted to determine the number N of photons in photon (pulse) P2 and generate photon count signals S4 and S5 that correspond to a single-photon pulse and a multi-photon pulse, respectively.

Regardless of whether the photon number N measured at PNR detector 40A is one or greater than one, the arrival of the photon count signals S4 or S5 at PNR detector 40A is registered at controller 22A. If N=0, no photon count signals are generated. In response to receiving a photon count signal S4 or S5, controller 22A triggers the modulation of pulse P1 at state preparation stage 30A via a trigger signal ST. In an example embodiment, controller 22A also generates a sync signal SS in sync signal unit 50A and sends this signal over to Bob's sync signal unit 50B to coordinate the processing of signal (pulse) P1' at Bob. In an alternatively embodiment, sync signals SS (dashed arrow) are generated by PNR detector 40A and sent to controllers 22A and 22B. In either embodiment, the sync signals SS need to be generated based on the detection of pulse P2 because the timing at which pulses P1 and P2 are generated has some uncertainty. Accordingly, a conventional sync signal generated by controller 22A based solely on the timing of the activation of laser 12 is problematic for the present invention.

The process of detecting pulse P2 at PNR detector 40A and then passing the resulting electrical signal through the control electronics (e.g., sync signal unit 50A) of controller 22A requires a finite period of time. Accordingly, in an example embodiment pulse P1 is delayed for the appropriate time on its way to state preparation stage 30A by delay line 26 in fiber link F1. The state (e.g., the polarization or phase) of pulse P1 is then randomly changed (e.g., via phase or polarization modulation) by state preparation stage 30A to create a state-modified pulse P1'. Pulse P1' is received by optical multiplexer 60A and is inputted into optical link 12 to travel over to Bob.

Timing and Time Slot Counting

In an example embodiment, controllers 22A and 22B at Alice and Bob work through their respective sync units 50A and 50B to ensure that the operation of state-detection stage 30B and detector unit 80 are coordinated with the expected arrival time of pulse P1' at state-detection stage 30B and detector unit 80. The expected arrival time of pulse P1' has a select duration (temporal width) and is referred to as a "time slot." The duration of the time slot is determined by the amount of time that state-preparation stage 30B is active. The location (in time) of each time slot is identified by the arrival times of photon count signals S4 and S5, which correspond in time to respective detected pulses P2.

PNR detector 40A at Alice detects the number of photons N in pulse P2 and hence the number of photons in pulse P1. This number N is registered in controller 22A via photon count signals S4 and S5 for the particular time slot associated with the corresponding pulse P1. For each time slot, controller 22A records the state imparted to pulse P1 (e.g., the randomly chosen modulation applied to the pulse by modulator M) by state preparation stage 30A in forming pulse P1'. Thus, for each time slot, the imparted state to pulse P1 and the photon count N for each pulse P1 is recorded.

The output signal from PNR detector 40A varies depending on the number of photons in pulse P2. In the example embodiment of PNR detector 40A of FIG. 3B, the output source analyzer (OSA) distinguishes between "zero," "one" and "above one" levels, and reports the results for "one" and "above one" to controller 22A via photon count signals S4 and S5. Each time a pulse P2 is registered by the PNR detector, signals S4 or S5 is sent to controller 22A. In response thereto, controller 22A sends a trigger signal ST to state preparation stage 30A, and in an example embodiment, a sync signal SS to sync unit 50A. Trigger signals ST and sync signals SS constitute "timing signals," since they act to set the timing for the activation state preparation stage 30A, state detection stage 30B (when activation of the state detection stage is required), and detector unit 80.

At Bob, in an example embodiment, each time controller 22B is notified via sync signal SS that a pulse P1' is expected to arrive from Alice, state-detection stage 30B and detector unit 80 are activated via respective activation signals S9 and S10 for a duration corresponding to the time slot. State-detection stage 30B at Bob creates a twice-altered (e.g., twice modulated) pulse P1". The (random) setting for state-detection stage 30B is recorded in controller 22B for the corresponding time slot. Pulse P1" is then detected with detector unit 80 and the detection event stored in controller 22B for each time slot. Because of losses, some time slots will not register a detection event. Thus, typically a subset of pulses P1' sent from Alice to Bob are actually detected. This process is repeated for a given number (i.e., a "block") of exchanged pulses P1'. In an example embodiment, the block size is that sufficient to for a useful final key after the usual processing operation such as error-reduction, sifting and privacy amplification.

Security Analysis

As discussed above, the original Hwang's method is particularly effective in establishing the security of a QKD system for the ideal case of when the Bob's detector dark current is zero. However, real systems have non-zero detector noise. Consequently, the dark current becomes a very important parameter because in the "decoy—signal" pair, one of the signals is weak. In the present invention, a multi-photon signal plays the role of a decoy signal.

Figure 5:
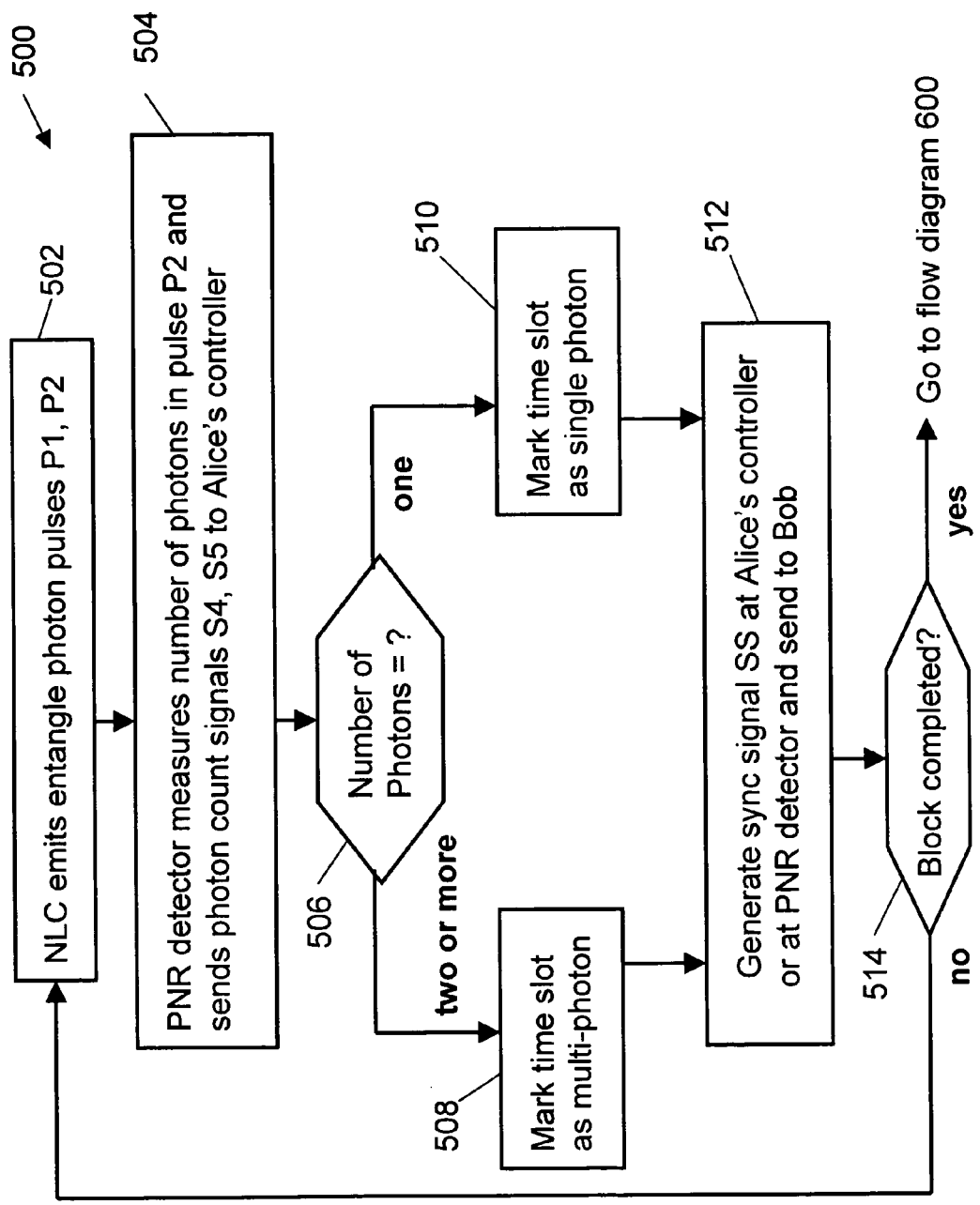
FIG. 5 is a flow diagram illustrating the method of transmitting a block of pulses from Alice to Bob while identifying the time slots associated with both single-photon and multi-photon pulses.
Figure 6:
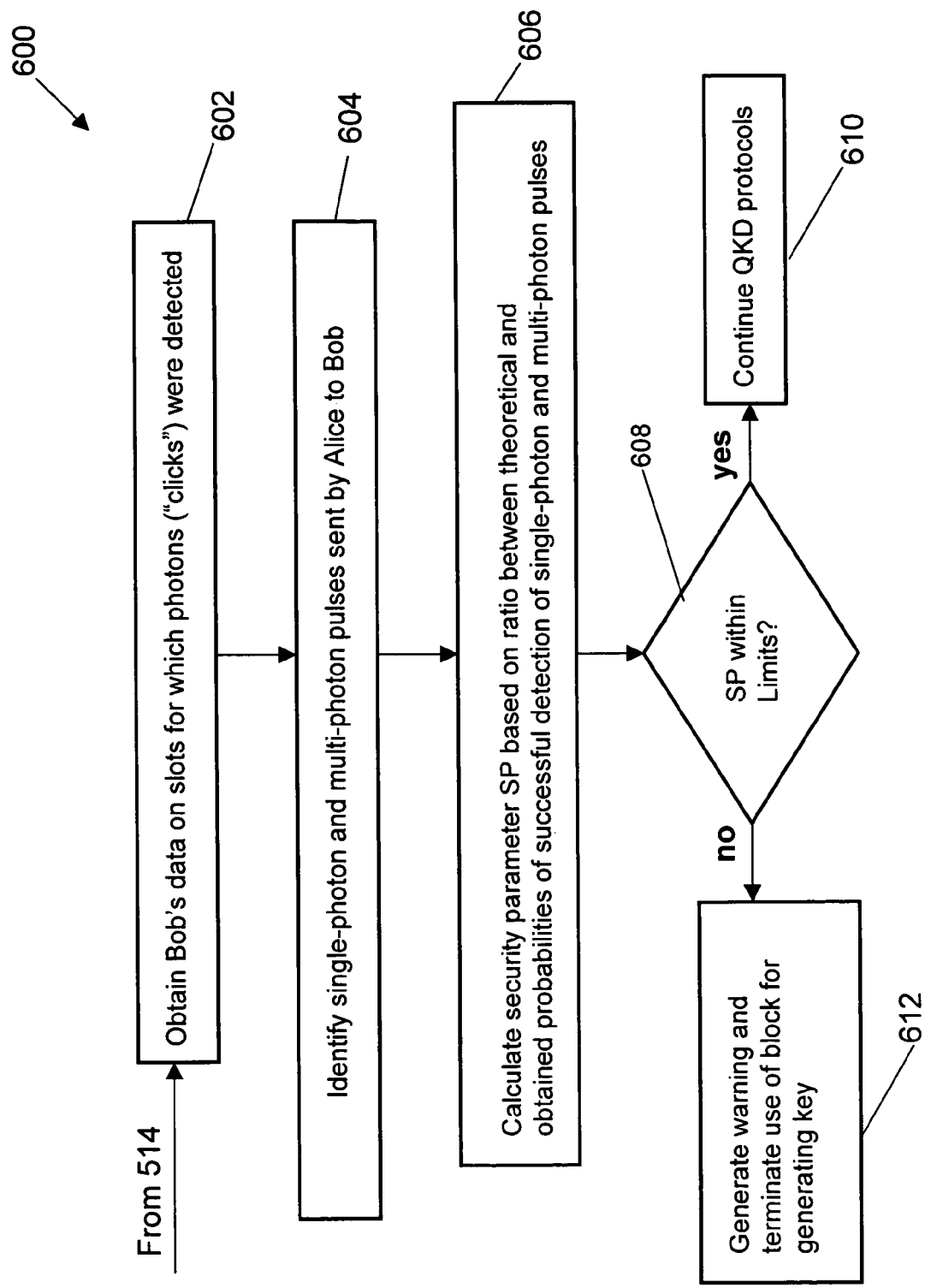
FIG. 6 is a flow diagram that continues from the flow diagram of FIG. 5, and that illustrates the method of calculating the security parameter SP based on the theoretical vs. actual detection of single-photon pulses and multi-photon pulses.

FIGS. 5 and 6 include respective flow diagrams 500 and 600 that together set forth the method for ensuring that an eavesdropper has not taken advantage of multi-photon pulses sent by Alice. With reference to flow diagram 500 of FIG. 5, in 502 NLM 24 is irradiated with laser pulses P0 from laser 20. In response thereto, NLM 24 emits entangled photons (pulses) P1 and P2. In 504, PNR detector 40A measures whether pulse P1 contains a single photon or multiple photons and communicates this information to controller 22A via photon count signals S4 or S5. In query 506, if the number of photons in pulse P2 is two or more, then the method proceeds to 508, wherein the time slot corresponding to transmitted pulse P1 is identified (marked) in controller 22A as a multi-photon slot. If in query 506 the number of photons in pulse P2 is equal to one, then the method proceeds to 510, wherein the time slot corresponding to transmitted pulse P1 is marked in controller 22A as a single-photon slot.

In 512, a sync signal SS is generated at Alice, either by sync unit 50A in response to the arrival of a photon count signal S4 or S5, or by PNR detector 40A directly. Sync signals SS sent to controller 22B from Alice alert Bob to expect pulse P1 at a select time for the given time slot.

In 514, the process is repeated until a sufficiently large block of pulses (e.g., enough pulses to form a key or to perform a statistical analysis of detected single-photon pulses versus detected multi-photon pulses) has been transmitted to Bob. Bob stores data in controller 22B relating to the detected pulses as a function of the different time slots.

With reference now to flow diagram 600 of FIG. 6, once a sufficiently large block of pulses has been sent from Alice to Bob in 514, then the method proceeds to 602. In 602, the time slots for which Bob actually detected (registered) a photon are identified from the data stored in controller 22B and sent to Alice's controller 22A. In 604, the pulses sent as single-photon pulses and the pulses sent as multi-photon pulses are identified per the data stored in controller 22A.

In 606, Alice compares the data sent by Bob to her data and calculates the probability of detecting initial "single photon" pulses (in reality, these pulses can contain more than one photon due to non-perfect detection of the trigger photon(s)), and corresponding probability for multi-photon pulses. Alice then calculates the ratio of probabilities and compares the result with the theoretical estimate. This is done, for example, by defining a security parameter SP as the ratio of obtained and theoretical probabilities for detecting single-photon and multi-photon pulses. Forming an example security parameter SP is discussed in detail below.

In 608, if the detection probability of multi-photon pulses significantly exceeds the theoretical prediction, then the security parameter SP will exceed some defined limit, indicating the possibility of an attack on the system's security. If this is the case, then in 610 a warning is generated to terminate the use of the block of photons to establish a key. On the other hand, if the security parameter SP remains within the defined limit, then the block of photons is deemed to have been securely exchanged and the QKD protocol continues to establish a final key.

Example Security Parameter

In establishing a security parameter SP, it is assumed that initial photon pair distribution is Poissonian with a mean number of photons $\mu$ for some characteristic time interval m. The character time interval may correspond to the duration for which the modulator is activated. Defining p1 as the probability that initial pulse sent by Alice contains one and only one photon and p2 as the probability that initial pulse sent by Alice contains two or more photons, then the probabilities p1 and p2 are given respectively by:

$$p1 = \mu \exp(-\mu) \quad (0.1)$$

$$p2 = \frac{\mu^2}{2} \exp(-\mu)$$

The probability that a single-photon state will be delivered to Bob over the quantum channel with transmittivity $\eta$ is:

$$\eta p1 \quad (0.2)$$

The probability that a two-photon state will be delivered to Bob as a single photon state is:

$$2\eta(1-\eta)p2 \quad (0.3)$$

The probability that a two-photon state will be delivered to Bob as a two-photon state is:

$$\eta^2 p2 \quad (0.4)$$

The probability that an initial two-photon state will be detected by Alice is:

$$\frac{1}{2}\xi_D p2 \quad (0.5)$$

where $\xi_D$ is the quantum efficiency of the detector. The probability that the initial two-photon state will be not detected by Alice is:

$$\left(1 - \frac{1}{2}\xi_D^2\right)p2 \quad (0.6)$$

It is assumed that Eve seeks to intercept the quantum signals in the quantum channel without being detected. A suppression coefficient κ represents Eve's ability to block initial single-photon pulses. The suppression coefficient κ ranges from 0 and 1, wherein κ=0 corresponds to the case when Eve blocks all the initial single photon pulses, thus making the channel absolutely insecure, and wherein κ=1 corresponds to the case of no suppression of the transmittivity.

To remain undetected, Eve needs to keep the overall key generation rate unchanged. Accordingly, Eve must increase the delivery of the two-photon pulses by:

$$\frac{p1(1-\kappa) + 2p2}{2p2} \quad (0.7)$$

Here, it is assumed that the probability of having more than two-photons in a multiple-photon pulse is negligible.

It is also assumed that Eve cannot influence the overall detector efficiency $\xi_D$, so that Alice and Bob are sure about how many "clicks" (i.e., detection events) Bob obtains from the photons pulses P1 sent by Alice. Accordingly, the following approximations are made:

$$1-\eta \approx 1$$

$$\eta^2 \approx 0 \quad (0.8)$$

Then Alice and Bob must control the security parameter SP as a "Ratio" (R) given by:

$$R(\kappa) = \frac{p1\kappa + a\left(1 - \frac{1}{2}\xi_D^2\right)p2\left(\frac{1}{\mu}\left(1 + \frac{\mu}{2} - \kappa\right)\right)}{a\frac{1}{2}\xi_D^2 p2\left(\frac{1}{\mu}\left(1 + \frac{\mu}{2} - \kappa\right)\right)} \quad (0.9)$$

where "a" is a coefficient corresponding to the degree by which Eve increases the transmittivity of multi-photon pulses to keep the overall key rate constant.

Figure 7:
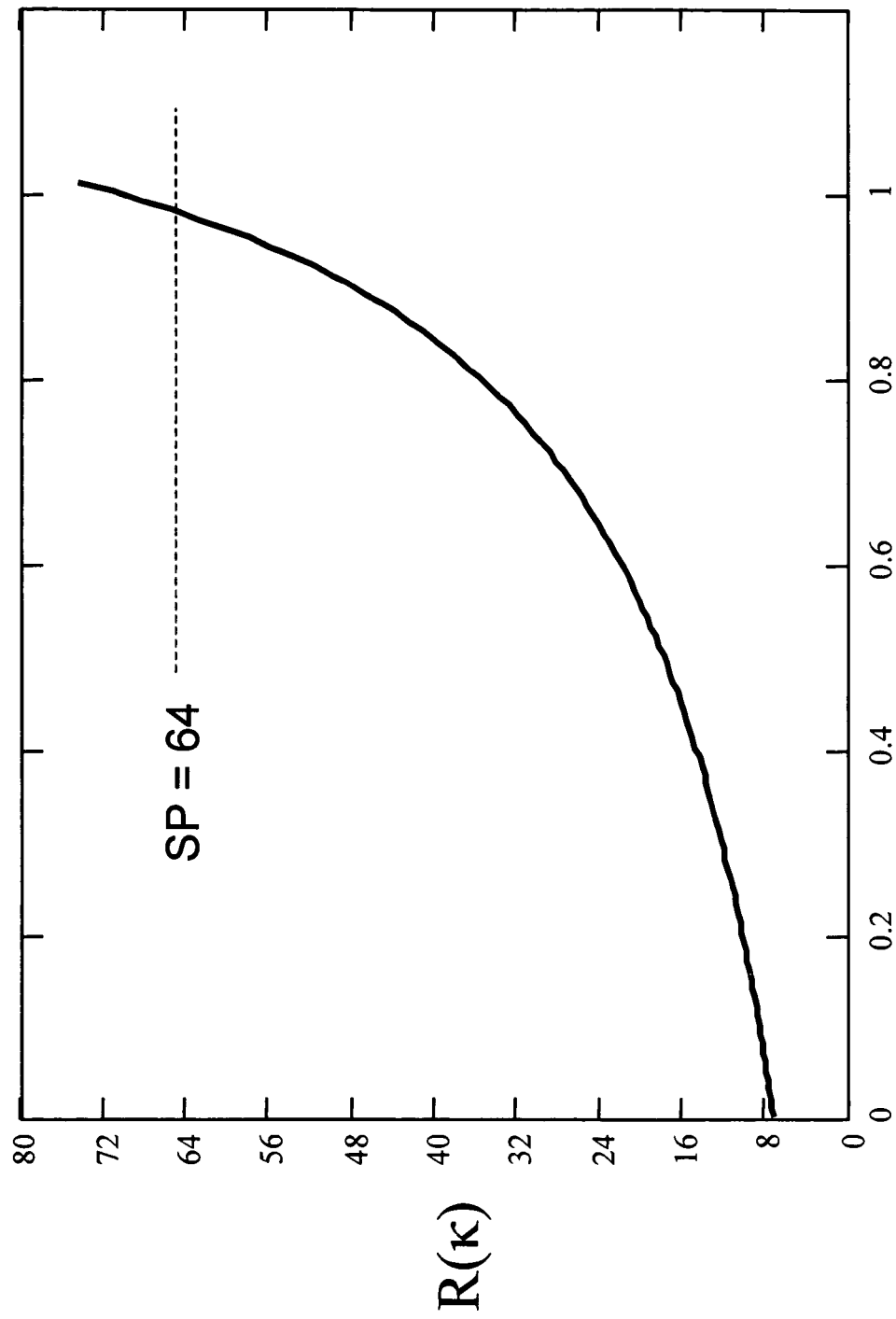
FIG. 7 is a plot of $R(\kappa)$ VS. $\kappa$ as an example security parameter (SP) used to detect the presence of an eavesdropper who is changing the transmittivity of the quantum channel for multi-photon pulses in their attempt to eavesdrop.

The ratio R constitutes an example security parameter SP for the system. A plot of R vs. κ for $\eta=10^{-2}$, $\xi_D=0.5$, $\mu=0.5$, and a=1 is shown in FIG. 7. For a given $\xi_D$ and $\mu$, R is maximum if the single-photon and multi-photon channel transmittivities remain unchanged. Since all the parameters are known for Alice and Bob, they can explicitly calculate these coefficients with respect to particular experimental conditions and store them for future comparison with real data. The ratio R always decreases if Eve suppresses single-photon transmittivity with a corresponding increase in two-photon (or multiple-photon) transmittivity. Thus, any attempt made by Eve of taking advantage of the channel loss is detectable.

With reference to FIG. 7, if Eve suppresses essentially all of the initial single-photon pulses, then κ~0 and R(0)=7. This value is independent of the transmittivity of the channel and depends only on the quantum efficiency of the detector used. Thus, even if Eve changes a (the overall efficiency of multi-photon delivery from Alice to Bob) she cannot change this value of R. On the other hand, for essentially no suppression of the channel transmittivity, κ~1 and R(1)=71. This condition represents completely secure communication. The security of the quantum channel can thus be monitored by calculating R on an ongoing basis seeing if it changes. If Eve attempts to gain information from the channel and alters its transmittivity in the process, R will decrease from its optimum value (e.g., R(1)=71 in FIG. 7), thereby revealing Eve's presence. In practice, the value of R may change due reasons other than an eavesdropper, such as from environmental effects. Accordingly, in an example embodiment, the security parameter SP is selected to be a threshold value of R—for example, R=64 in FIG. 7—below which an alarm is issued to indicate eavesdropping, or more generally, a problem with the system.

In the foregoing Detailed Description, various features are grouped together in various example embodiments for ease of understanding. The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction, operation and example embodiments described herein. Accordingly, other embodiments are within the scope of the appended claims.

What is claimed is:

1. A method of forming a key in a quantum key distribution (QKD) system having optically coupled first and second QKD stations Alice and Bob, comprising:
   generating at Alice, via a single light source that operates via spontaneous parametric down conversion using a non-linear medium, correlated pairs of photon pulses, with one of the pulses in each pair serving as an outgoing pulse having either a single-photon or multiple photons;
   at Alice, identifying time slots and a number of photons in each outgoing pulse by detecting the other of the outgoing pulse for each pulse pair using a photon-number-resolving (PNR) detector;
   communicating the time slot identities from Alice to Bob;
   altering the state of each outgoing pulse;
   transmitting a block of altered-state outgoing pulses from Alice to Bob;
   performing at Bob a second state alteration of each outgoing pulse received at Bob and then detecting each twice-altered outgoing pulse;
   determining at Bob a first number of detected single-photon pulses and a second number of detected multi-photon pulses using said time slot identities; and
   comparing the first and second numbers to respective probabilities of detecting said first and second numbers.

2. The method of claim 1, wherein the first and second altering of the state of the outgoing pulses at Alice and Bob, respectively, includes applying a random phase modulation to the outgoing pulses based on a select set of possible phase modulations.

3. The method of claim 1, further comprising:
defining a security parameter based on probabilities of detecting single-photon and multi-photon pulses;
comparing the security parameter to data that includes the number of detected single-photon pulses and the number of detected multi-photon pulses; and
generating an alarm if the security parameter indicates a possible breach of security of the QKD system.

4. The method of claim 1, further comprising:
generating timing signals from said detecting of the others of the outgoing pulses.

5. The method of claim 4, wherein generating the timing signals includes generating synchronization signals and then sending the synchronization signals from Alice to Bob.

6. The method of claim 5, wherein generating the timing signals includes:
generating a trigger signal and then causing the modulation of the outgoing pulse using the trigger signal.

7. The method of claim 1, wherein altering the state of each outgoing pulse includes imparting one of a first random phase and a first random polarization.

8. The method of claim 1, wherein performing a second state alteration of each outgoing pulse received at Bob includes imparting one of a second random phase and a second random polarization, wherein the first and second alterations are either both phase or both polarization alterations.

9. The method of claim 1, wherein the non-linear medium comprises a non-linear crystal.

10. The method of claim 9, including forming the non-linear medium as a bulk crystal or a waveguide-based crystal.

11. The method of claim 1, further comprising optically connecting the non-linear medium to the PNR detector using an optical fiber.

12. The method of claim 1, further comprising optically connecting the non-linear medium to a first modulator at Alice with an optical fiber that includes a delay line for delaying the arrival of the outgoing pulse at the first modulator.

13. The method of claim 12, further including optically coupling Alice and Bob with an optical fiber link.

14. The method of claim 1, including:
generating a trigger signal upon detecting the other of the outgoing pulse; and
modulating the outgoing pulse using a modulator activated by the trigger signal.

\* \* \* \* \*